Oct. 21, 1952    W. F. HUNTER ET AL    2,614,427
APPARATUS FOR INDICATING LIQUID LEVEL
Filed April 10, 1951
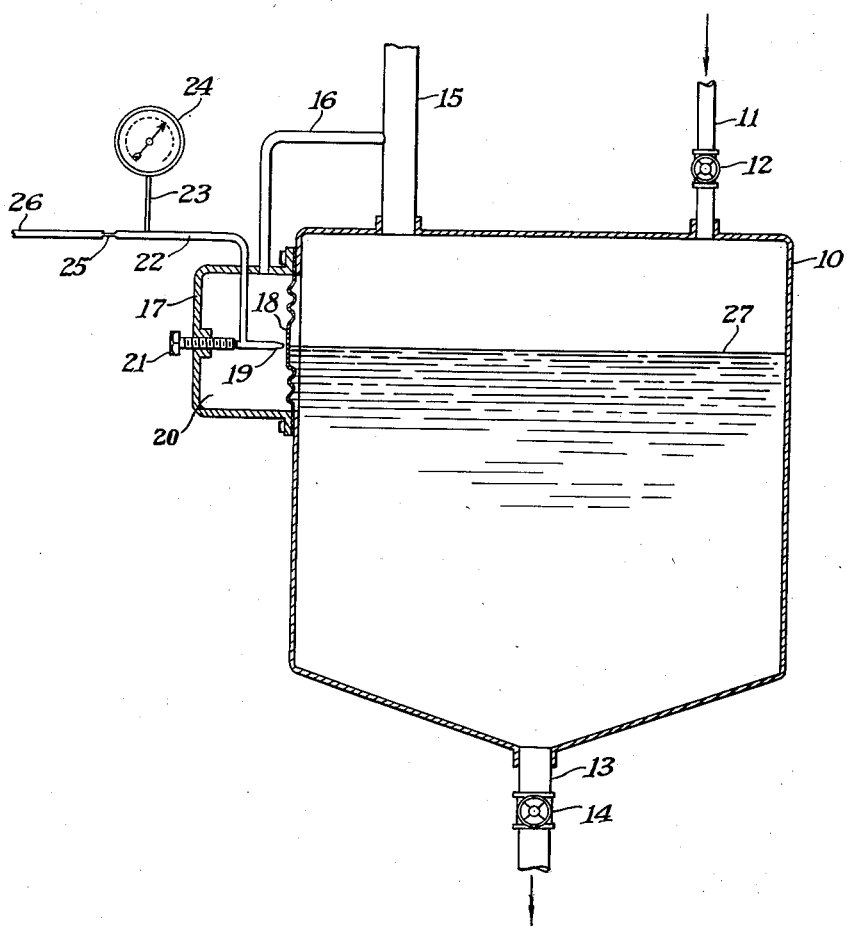
WALKER F. HUNTER
EINAR W. JENSEN
INVENTORS
BY Daniel J. Mayne
Walter O. Hodsdon
ATTORNEYS Patented Oct. 21, 1952

2,614,427

UNITED STATES PATENT OFFICE 2,614,427

APPARATUS FOR INDICATING LIQUID LEVEL

Walker F. Hunter and Einar W. Jensen, Rochester, N. Y., assignors to Eastman Kodak Company, Rochester, N. Y., a corporation of New Jersey Application April 10, 1951, Serial No. 220,295

1 Claim. (Cl. 73—299)

This invention relates to apparatus for measuring the level of a liquid in an enclosed tank, and more particularly to apparatus which is especially adaptable for determining within a relatively narrow vertical range, the level in a tank, or similar container, of highly viscous solutions such as cellulose organic ester solutions and the like.

With such highly viscous solutions the usual types of level gauges such as floats, gauge glasses, and certain pressure measuring devices in certain instances cannot be employed effectively due to the physical properties of the liquid such as viscosity and density variation. Because of the highly volatile and in some instances inflammable solvents employed with cellulose organic acid ester solutions, electrical type level controls are undesirable since there is always a possibility that an explosive air-solvent mixture might exist in the presence of the electrical control mechanism and be exploded by electric arcs produced by the mechanism. After some investigation we have found that a level indicating device which is pneumatically operable is quite satisfactory for employment in measuring the level of various liquids and solutions.

An object, therefore, for the present invention is an apparatus for indicating the level of a liquid in an enclosed tank within a desired vertical range of levels.

Another object of the invention is a liquid level indicating apparatus which will operate effectively with highly viscous solutions, such as cellulose organic acid ester solutions.

Still another object of the invention is a simple, inexpensive and safe level indicating device for use in connection with highly viscous and/or inflammable solutions.

Other objects will appear hereinafter.

The invention will be understood from the following detailed description and related drawing having parts both in section or broken away. In the drawing, which is not to scale, the tank normally being much larger than the level indicating device, tank 10 made, for example, of metal such as stainless steel is shown containing a viscous solution 27, the level of which is to be indicated on gauge 24 when it is within a certain vertical range of levels in the tank 10. The solution 27 may be introduced into tank 10 through pipe 11 which has valve 12 therein and it may be withdrawn from the bottom of the tank through pipe 13 which has valve 14 therein. The tank may be, for example, a place of storage for a cellulose ester solution which has been formed elsewhere.

As evident in the drawing the upper left side of the tank 10 has an opening therein which is closed tightly by a flexible metal diaphragm 18 which is tensioned radially so it forms a vertical plane and, therefore, separates the liquid 27 from a chamber 20 formed by an encasing member 17. A conduit 16 connects chamber 20 with conduit 15 which in turn is connected with tank 10. Conduit 15 is vented to the air at a point not shown, which is remote from the tank.

An air nozzle 19 at the end of pipe 22 is positioned within chamber 20 to discharge compressed air against diaphragm 18 at its approximate center point. As shown in the drawing the compressed air impinges on the diaphragm 18 substantially at a right angle. An adjusting screw 21 engaging and passing through member 17 contacts pipe 22 adjacent its nozzle and is adapted to regulate the distance of the nozzle 19 from the diaphragm 18. Compressed air from a source, not shown, flows through pipe 26, restriction 25 to aforesaid pipe 22. Pressure gauge 24 is connected to pipe 22 through pipe 23. The nozzle 19 is first adjusted by screw 21 to a distance from the diaphragm 18 so that air striking the diaphragm will produce a constant back pressure, at some desired point in the range of 5 to 10 p. s. i. g. between the restriction 25 and nozzle 19 when there is no liquid 27 in contact with the diaphragm 18. Compressed air at about 20 p. s. i. g. is supplied to the restriction 25. Pressures of 15 to 30 p. s. i. g. could be employed and the selected pressure should be substantially constant. The nozzle back pressure is, of course, measured by gauge 24.

The apparatus operates as follows: With no liquid in contact with the diaphragm 18, and air flowing out of the nozzle 19 against diaphragm 18, the nozzle back pressure is at a desired value, for example, 7 p. s. i. g. As the liquid level rises over the face of the diaphragm 18 the diaphragm is deflected outwardly (to the left) thereby tending to seal off the opening between the nozzle 19 and diaphragm 18. This action results in an increase in nozzle back pressure which is measured by gauge 24. By calibration, the nozzle back pressure as shown by gauge 24 can be related to the height of the liquid within vertical liquid height corresponding to the height of the diaphragm 18.

Any change in pressure in the gas or vapor space above the liquid would affect the response of this apparatus unless the pressure in chamber 20 were the same, therefore, for any enclosed tank, the nozzle must be enclosed by member 17 which is vented through pipe 16 and 15 to the gas space above the liquid in tank 10. This connection through pipes 15 and 16 cancels any change in gas or vapor pressure in either chamber 20 or tank 10. Pipes 16 and 15 of course also permit the compressed air flowing from nozzle 19 to flow out of chamber 20. This device will operate effectively with highly viscous cellulose ester solutions of the order of 60,000 to 100,000 c. p. s. such as those described in U. S. Patent 2,541,012 of February 13, 1951, although it is equally effective with liquids of less viscosity and could be employed even for measuring the height of water in such a tank.

It will be evident that our liquid level device will not indicate the amount of liquid in the tank when its level is below the level range measurable by the diaphragm although indicating that the tank is not full. However, this is immaterial for some purposes and we have found that our simple and relatively inexpensive level gauge is desirable for various applications.

We claim:

Apparatus for measuring liquid level in a tank comprising in combination a tank containing liquid, the changing level of which is to be measured, an aperture in the side of the tank, a flexible diaphragm positioned over the aperture and adapted to contact the liquid over a certain vertical level range and to move inwardly and outwardly by variance in liquid pressure produced by changes in liquid level in the tank within said level range, a casing enclosing the opposite side of the diaphragm and forming a chamber therearound, a compressed air pipe having a nozzle extending into the chamber adapted to discharge air onto the approximate center point of the diaphragm, a restriction in the pipe outside the chamber, a pressure gauge attached to the pipe adjacent the restriction and between the restriction and the nozzle adapted to measure the change in back pressure of the air flowing through the nozzle as the movement of the diaphragm varies the flow of air through the nozzle in direct ratio to the change in fluid level over said range, and means for venting gases in said chamber and tank to the atmosphere.

WALKER F. HUNTER.
EINAR W. JENSEN.

REFERENCES CITED

The following references are of record in the file of this patent:

UNITED STATES PATENTS

| Number | Name | Date |
| --- | --- | --- |
| 1,981,354 | Goerg | Nov. 20, 1934 |
| 2,265,114 | Hartley | Dec. 2, 1941 |
| 2,331,208 | Ludi | Oct. 5, 1943 |
| 2,359,236 | Moore | Sept. 26, 1944 |
| 2,434,098 | Bays | Jan. 6, 1948 |
| 2,455,284 | Versaw | Nov. 30, 1948 |
| 2,457,401 | Rupley | Dec. 28, 1948 |